United States Patent
van Dijk et al.

(10) Patent No.: US 8,683,570 B1
(45) Date of Patent: Mar. 25, 2014

(54) SCHEDULING SOFT TOKEN DATA TRANSMISSION

(75) Inventors: Marten van Dijk, Somerville, MA (US); Kevin D. Bowers, Melrose, MA (US); Samuel Curry, Andover, MA (US); Nikolaos Triandopoulos, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 77 days.

(21) Appl. No.: 13/435,611

(22) Filed: Mar. 30, 2012

(51) Int. Cl.
*H04L 29/06* (2006.01)
*G06F 21/35* (2013.01)

(52) U.S. Cl.
CPC ...................................... *G06F 21/35* (2013.01)
USPC ............................................................. 726/9

(58) Field of Classification Search
None
See application file for complete search history.

(56) References Cited

U.S. PATENT DOCUMENTS

| 7,904,946 B1 * | 3/2011 | Chu et al. ........................... 726/5 |
| 2004/0172535 A1 * | 9/2004 | Jakobsson et al. ............ 713/168 |
| 2007/0250923 A1 | 10/2007 | M'Raihi |
| 2012/0260093 A1 | 10/2012 | Benson et al. |

FOREIGN PATENT DOCUMENTS

EP                   2498455 A1     9/2012

OTHER PUBLICATIONS

Juels et al., "Key Update With Compromise Detection," U.S. Appl. No. 13/250,225, filed Sep. 30, 2011.

* cited by examiner

*Primary Examiner* — David Pearson
(74) *Attorney, Agent, or Firm* — BainwoodHuang (57) ABSTRACT

An improved technique provides scheduled data transfer between a mobile device and a server. The mobile device combines token codes generated by a soft token with sequences of auxiliary bits and displays the combinations to users as passcodes. Users may then copy the passcodes to their computers for authenticating to a server on a remote network. As the passcodes include both token codes and sequences of auxiliary bits, a communication channel is established whereby the auxiliary bits as well as the soft token codes are transmitted from the mobile device to the server.

20 Claims, 6 Drawing Sheets

SCHEDULING SOFT TOKEN DATA TRANSMISSION

BACKGROUND

Computer networks, such as those provided at a workplace, university, or other organization, are often configured to allow users to gain access to a network remotely through virtual private networks (VPNs), customized network settings, and/or other technologies. To be granted access, users are generally required to authenticate to the remote network. Authentication may involve users providing various authentication factors, such as passwords, token codes, and personal identification numbers (PINs). Authentication factors may be received as part of authentication requests by an authentication server, which either grants or denies access, based on whether authentication factors provided with the requests match expected values.

A common authentication scheme involves token codes. Token codes may be used alone or in combination with other authentication factors. Token codes, also known as one-time passwords, or "OTPs," are generated automatically, such as by portable devices (i.e., "hard tokens"), which may be distributed to users. Hard tokens are specialized devices, such as key fobs, which are designed to produce token codes at regular intervals. To authenticate to a remote network, a user enters the token code displayed by the hard token in a field of a network login screen on the user's computer. Access to the remote network may then be granted or denied based on whether the authentication server can verify the token code. An example of a hard token is the SecurID® token code generator, which is available from RSA Security Inc. of Bedford, Mass.

Recently, software has been developed to perform the functions of hard tokens on smart mobile devices, such as smart phones, PDAs, and tablets. These "soft tokens" generate token codes at regular intervals and are displayed on display screens of the mobile devices. As with token codes from hard tokens, token codes from soft tokens are manually entered by users in login screens of the users' computers. Access to remote networks is then either granted or denied based on whether the token codes from the soft tokens match expected values.

SUMMARY

Unfortunately, communications between soft tokens and servers are typically limited to the soft tokens displaying token codes. Like hard tokens, soft tokens produce token codes but typically do not communicate any other information to a server. It has been recognized, however, that security could be advanced if a mobile device running a soft token could convey additional information to a server. For example, security could be advanced if a soft token could inform an authentication server when the soft token was hacked, or when the mobile device on which the soft token is run was rendered insecure. Security could further be enhanced if the server were allowed to collect data about the soft token, which could be used to ensure that the soft token was genuine or that it was being used by the same person or in the same manner in which it has been used in the past.

Reliable communication from the mobile device to the server has previously been difficult, however. Even though modern mobile devices are equipped with Internet connections, these devices are often offline. Also, given that the information sought from the mobile device may relate to malicious activity, any communication from a mobile device suspected of being hacked is itself likely to be compromised.

In contrast with the conventional approach, in which soft tokens running on mobile devices are limited to providing only token codes, an improved technique provides scheduled data transfer between a mobile device and a server. The mobile device combines token codes generated by a soft token with sequences of auxiliary bits and displays the combinations to users as passcodes. A scheduler is configured for providing different sequences of auxiliary bits at different times, e.g., in different passcodes. Users may copy the passcodes to their computers for authenticating to a server on a remote network. As the passcodes include both token codes and sequences of auxiliary bits, a communication channel is established whereby the auxiliary bits as well as the token codes are transmitted from the mobile device to the server. The server may then extract the token code and auxiliary bits from each passcode, apply the token code for authentication, and use the auxiliary bits for a range of operations, which may include but are not limited to authentication.

In some examples, the sequences of auxiliary bits include a silent alarm, i.e., a signal that appears random but in fact varies in a way that is predictable by the server. When the mobile device detects malicious or suspect activity, it triggers the silent alarm to inform the server of the suspect activity. The server may then be configured to distrust any data conveyed on auxiliary bits that include a triggered silent alarm.

In certain embodiments, a method of transmitting data from a mobile device to a server through a computing device connected to the server over a network includes collecting a set of data stored on the mobile device. The method further includes generating multiple sequences of auxiliary bits representing different portions of the set of data. The method still further includes combining individual sequences of auxiliary bits with respective token codes generated by a soft token generator running on the mobile device to produce multiple passcodes, and displaying the passcodes to a user for manual transfer by the user to the computing device connected to the server over the network.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

An improved technique for a mobile device provides scheduled data transfer between the mobile device and a server. The mobile device combines token codes generated by a soft token with sequences of auxiliary bits and displays the combinations to users as passcodes. A scheduler is configured for providing different sequences of auxiliary bits at different times, e.g., in different passcodes.

Figure 1:
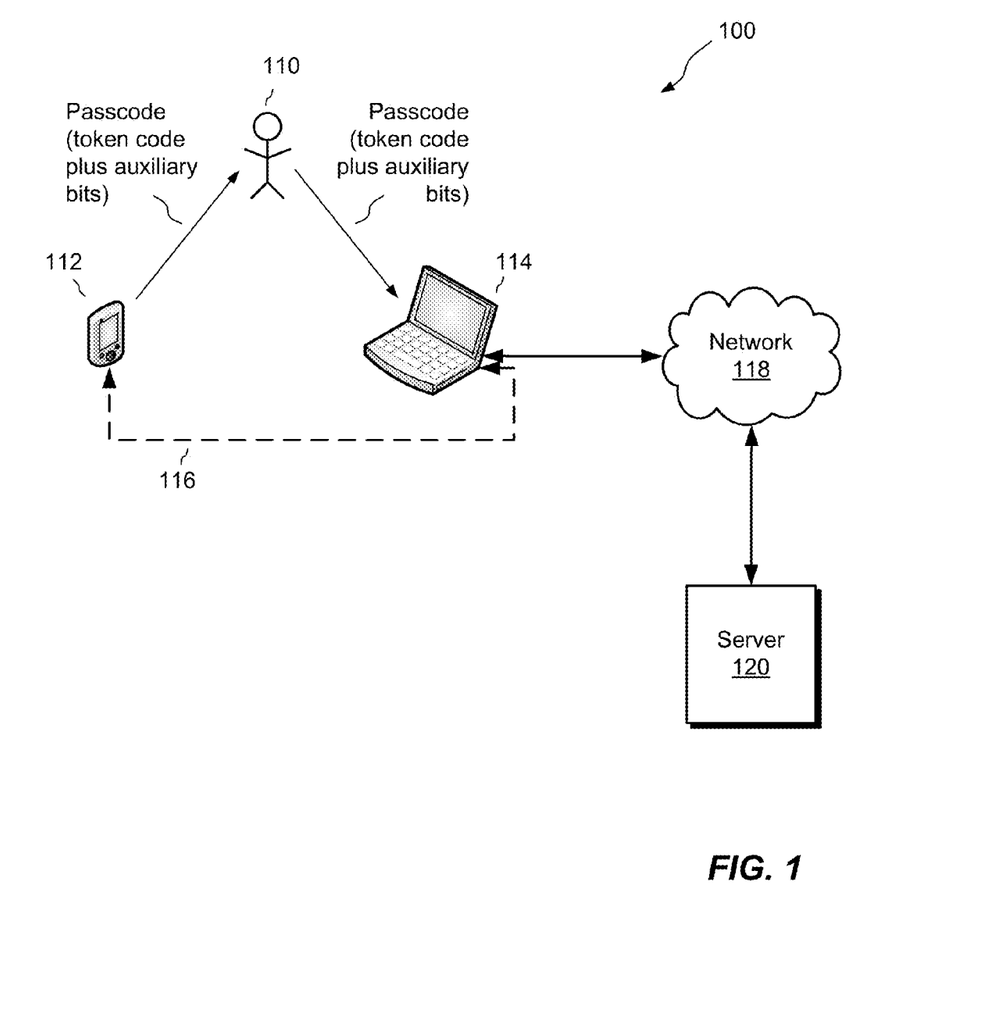
FIG. 1 is simplified schematic diagram of an example environment in which a mobile device combines sequences of auxiliary bits with token codes to produce passcodes that are displayed to users, wherein the users may transfer the passcodes to a local computing device.

FIG. 1 shows an example environment 100 in which data transfer may be conducted in accordance with the improvements hereof. A user 110 has access to a mobile device 112 and a computing device 114. The computing device is connected to a server 120 via a network 118. A communication medium 116, such as a cable or wireless connection, allows the mobile device 112 to communicate with the computing device 114.

The mobile device 112 includes a soft token generator, which generates token codes on a regular basis, such as once per minute. Within the mobile device 112, token codes are combined with sequences of auxiliary bits to produce passcodes. The auxiliary bits encode information about the mobile device 112, such as its security status, information about its hardware and/or software, and/or information about its environment. The mobile device 112 displays passcodes to the user 110. The user 110 may read one of the passcodes and manually copy the passcode into a field displayed on the computing device 114. Optionally, the user 110 may enter additional information, such as a user ID, Personal Identification Number (PIN), and/or other authentication factors. The user 110 may then submit an authentication request to the server 120 using the passcode and other identification factors.

The server 120, upon receiving the authentication request from the computing device 114, extracts the submitted token code and the sequence of auxiliary bits from the passcode. The server may then apply the token code in authenticating the user, and may apply the sequence of auxiliary bits in any of a variety of operations, which may include but are not necessarily limited to authenticating the user 110.

It is understood that the mobile device 112 can be any hand-held or otherwise portable device, including, for example, a smart phone, PDA, tablet computer, or even a portable computer (e.g., a laptop) or transportable desktop computer. Further, the mobile device 112 may be provided in the form of a special purpose portable security device that runs a soft token. The computing device 114 can also be any type of computing device, such as a laptop computer, desktop computer, server, tablet, smart phone or PDA. Further, the network 118 may include a physical network, such as a Local Area Network (LAN), a Wide Area Network (WAN), a virtual network, the Internet, some other network, or any combination of the foregoing, for example. The server 120 is typically an authentication server, or another server that has access to an authentication server. It is understood that the server 120 may include one or more computers operating in coordination to provide users with access to a remote resource, such as a corporate or other organizational network, for example.

Figure 2:
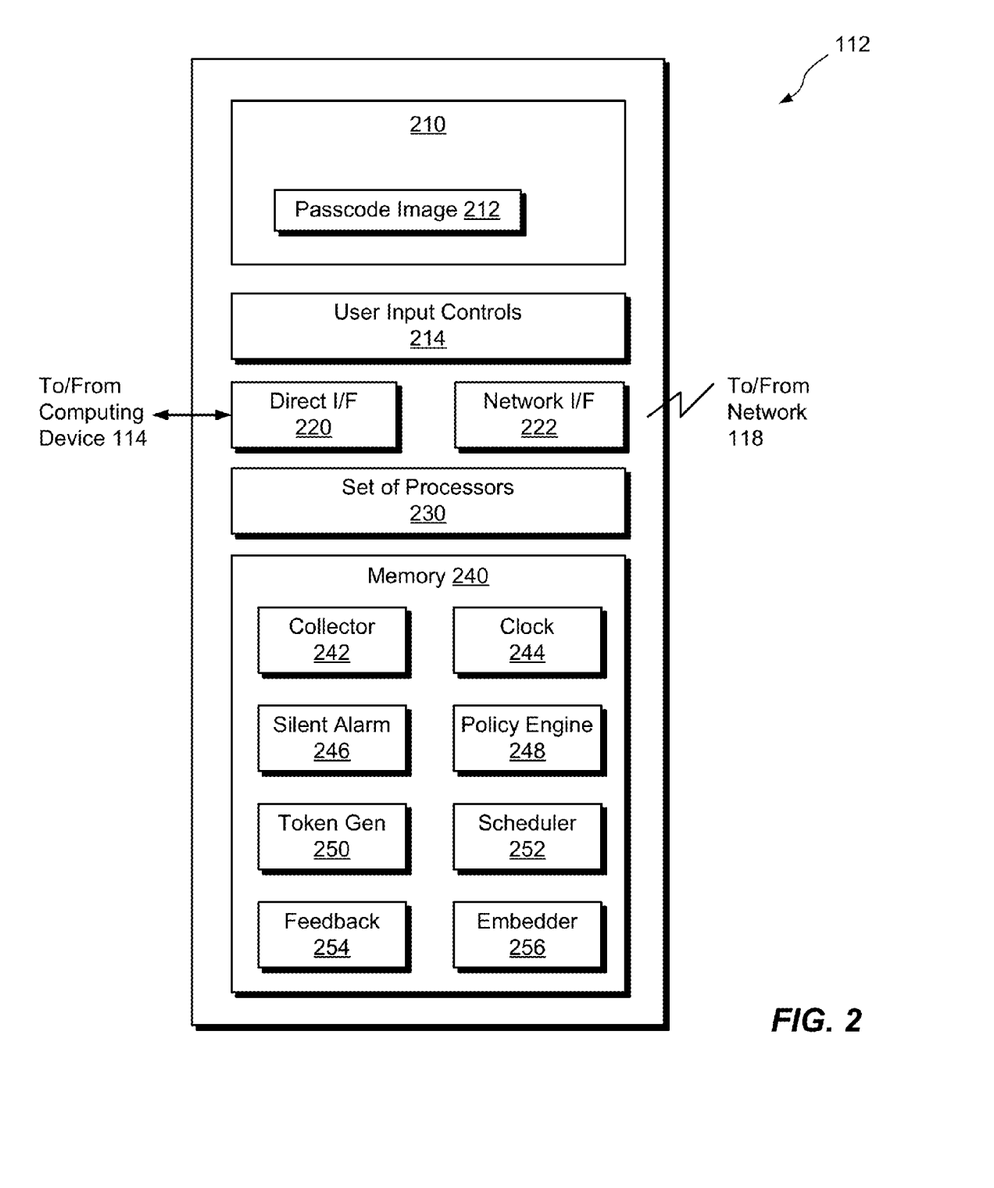
FIG. 2 is a block diagram of an example mobile device of FIG. 1.

FIG. 2 shows an example mobile device 112 in greater detail. The mobile device 112 is seen to include a display 210 for displaying text and/or images to the user 110. These may include a passcode image 212, for displaying passcodes to the user 110. The mobile device 112 also includes user input controls 214 (e.g., one or more buttons). A touchscreen may be provided in the user input controls 214 or integrated with the display 210. The mobile device 112 also includes a direct interface 220, for connecting to the computing device 114 using the communication medium 116, and a network interface 222, for connecting wirelessly to the network 118.

The mobile device 112 still further includes a set of processors (i.e., one or more processing chips or assemblies) and memory 240. It is understood that the set of processors 230 and the memory 240 together form a specialized circuit that is constructed and arranged for performing various functions and processes as described herein.

The memory 240 includes numerous software constructs, such as an operating system and applications (e.g., "apps"). Software constructs relative to the improvements herein may include a collector 242, a clock 244, a silent alarm 246, a policy engine 248, a token code generator 250, a scheduler 252, a feedback processor 254, and an embedder 256. These constructs will now be described in more detail with reference to FIG. 3.

Figure 3:
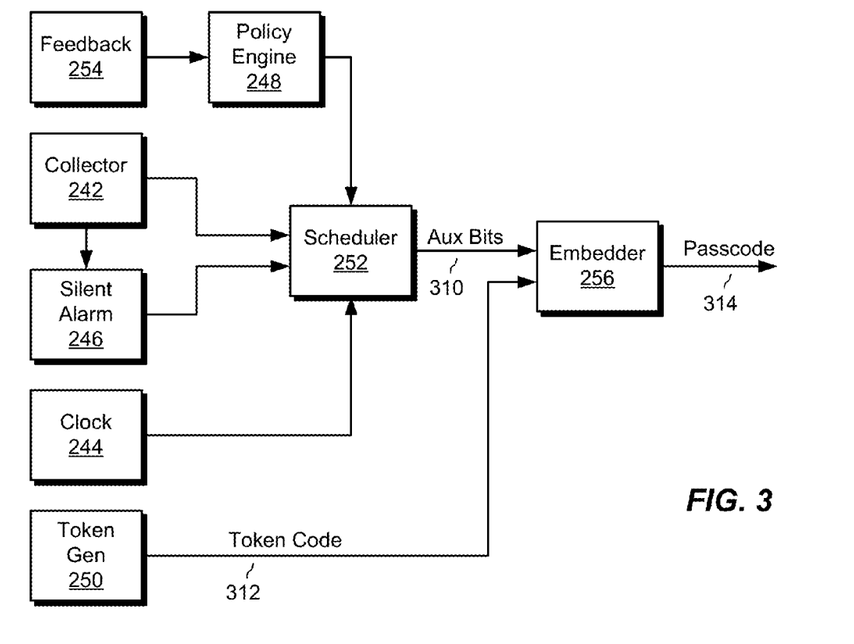
FIG. 3 is a block diagram of example portions of the mobile device of FIG. 2.

FIG. 3 shows an example arrangement of certain software constructs of the mobile device 112. Here, the collector 242 gathers information from the mobile device 112 to be transmitted to the server via passcodes. The information may cover a wide range of subjects, including, for example, information about the hardware, software, and/or environment of the mobile device 112. The collector 242 sends the collected information to the scheduler 252. The scheduler 252 also receives one or more silent alarm bits from the silent alarm generator 246. For example, a single silent alarm bit is sent to the scheduler 252. As will be described more fully with reference to FIG. 6, the silent alarm bit conveys an alarm to the server in response to the occurrence of a trigger event (such as may be generated by the collector 242, for example). Trigger events include detection of tampering of the mobile device 112, detection of malware running on the mobile device 112, and/or detection of other suspect activities.

With collected data received from the collector 242 and a silent alarm bit received from the silent alarm generator 246, the scheduler 252 accesses the policy engine 248 and outputs data received from the collector 242 in accordance with a policy prescribed by the policy engine 248. Data are output to the embedder 256 in the form of sequences of auxiliary bits 310. In one example, each sequence of auxiliary bits 310 is 4 bits long. The auxiliary bits 310 are then combined with token codes 312 from the token code generator 250. For example, the embedder 256 combines each 4-bit sequence of auxiliary bits 310 with a 6-digit or 8-digit token code 312 to produce a passcode 314. The passcode 314 is then displayed in the passcode image 212 of the display 210 of the mobile device 112.

The embedder 256 may combine auxiliary bits 310 and token codes 312 in any suitable way. In one example, the embedder 256 appends the auxiliary bits 310 to the token code 312, and subjects the combination to a reversible blending operation. The blending operation is known to the server 120, which may reverse the blending operation when passcodes 314 are received, to extract the auxiliary bits 310 and the token code 312.

The policy engine 248 determines how the scheduler 252 groups collected data into sequences of auxiliary bits 310. Depending on the policy of the policy engine 248, the scheduler 252 may assign one of the auxiliary bits 310 to be a silent alarm bit. In some examples, the scheduler 252 receives input from the clock 244. The scheduler 252 employs this input in a manner defined by the policy engine 248, in selecting collected data to be output via the auxiliary bits 310 at different times.

In some examples, the policy engine 248 receives feedback from the feedback processor 254, to apply feedback from the server 120 in updating a policy of the policy engine 248. In some examples, multiple policies are provided, and the information supplied by the feedback processor 254 is used to select which of the multiple policies to enact for production of auxiliary bits going forward. In some examples, feedback from the server 120 is received via the communication medium 116, such as when the mobile device 112 is plugged into the computing device 114 for charging or synching, or when the mobile device 112 communicates wirelessly with the computing device 114 using Wi-Fi or Bluetooth technology, for example. Also, in some instances, the mobile device 112 may communicate with the server 120 via the network 118, to obtain feedback information.

Figure 4:
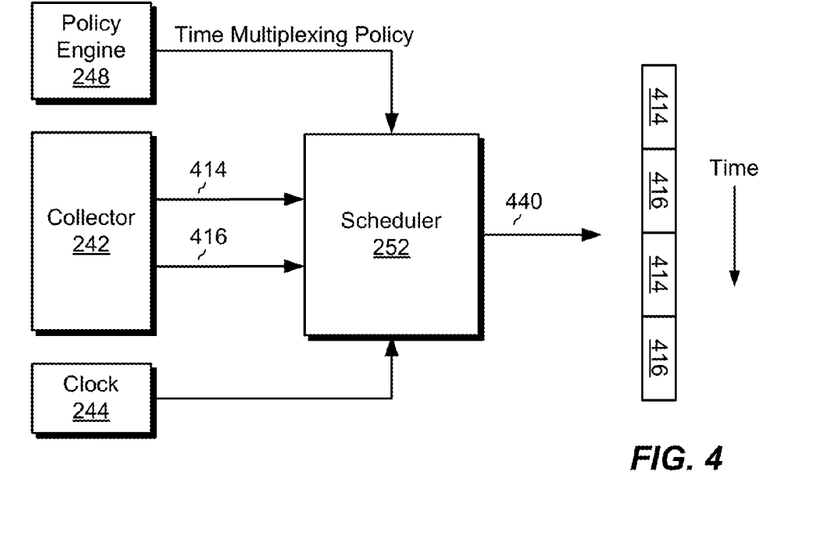
FIG. 4 is a block diagram of an example scheduler of FIGS. 2 and 3 configured for time multiplexing collected data.
Figure 5:
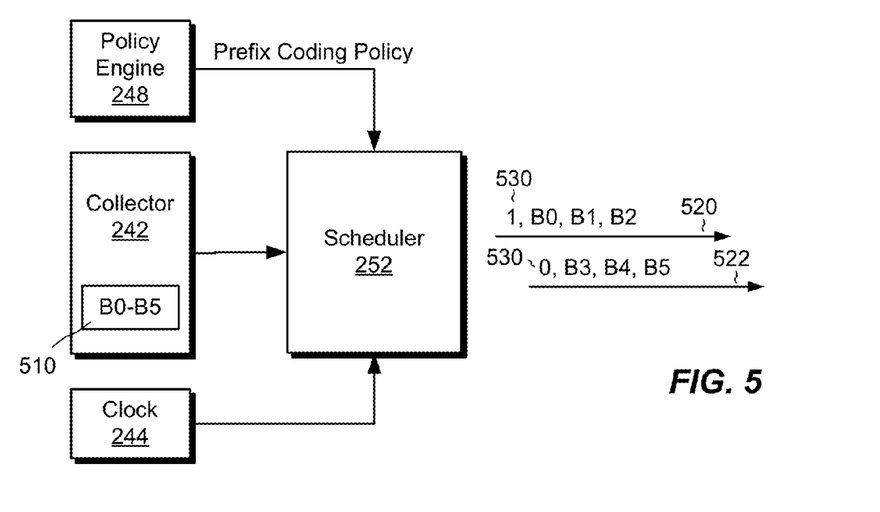
FIG. 5 is a block diagram of an example scheduler of FIGS. 2 and 3 configured for transmitting collected data over multiple passcodes using a prefix bit.

FIGS. 4-5 show example operation of the scheduler 252 according to different policies of the policy engine 248. FIG. 4 shows example operation of the scheduler 252 with a time multiplexing policy. Here, the scheduler 252 receives two different data sources 414 and 416 from the collector 242. The scheduler 252 also receives a clock signal from the clock 244. The two data sources 414 and 416 can represent any type of information. For example, data source 414 may represent software posture information about the mobile device 112 and data source 416 may represent hardware information about the mobile device 112. Alternatively, the data sources 414 and 416 may represent different portions of the same data. The scheduler 252 outputs sequences 440 of auxiliary bits based on an active time multiplexing policy of the policy engine 248. For example, the scheduler 252 may be configured by the policy engine 248 to output auxiliary bits containing bits from the data source 414 during "even" time intervals, and to output auxiliary bits containing bits from the data source 416 during "odd" time intervals. Even and odd time intervals are defined in connection with the clock 244. For example, the scheduler may partition time into 10-minute intervals, where successive 10-minute intervals alternate between even and odd. In such an arrangement, the time between 3:10 PM and 3:20 PM may be designated as an even time interval, whereas the time between 3:20 PM and 3:30 PM may be designated as an odd time interval. Passcodes generated by the mobile device 112 during even intervals would thus contain auxiliary bits from the data source 414, while passcodes generated during odd intervals would contain auxiliary bits from the data source 416. Typically, time multiplexing of this nature may continue over an extended period of time, such as hours or days, with the data of the data sources 414 and 416 repetitively output in the sequences 440 of auxiliary bits 310 and resulting passcodes 314. Repeating sequences in this manner increases the probability that the user 110 will apply some of the passcodes 314 containing data from the sources 414 and 416 during actual login attempts to the server 120, and thus that the server 120 will receive the data.

The time intervals specified by any given time multiplexing policy need not be uniform. A time multiplexing policy may therefore specify that the data source 414 be selected for inclusion in passcodes more often than the data source 416. For example, time intervals over which data source 414 are transmitted may be established to be 20, 30, or 40 minutes long, whereas time intervals over which the data source 416 is transmitted may be limited to a shorter interval, such as 10 minutes. Apportionment of different length time intervals for different data sources may reflect a higher priority of transmitting certain data as compared with other data.

As an alternative to making time intervals longer for some data than for others, intervals may be kept uniform and relatively short (e.g., 1 minute) and the policy may be configured to allocate more timeslots (i.e., time intervals) to the higher priority data than to the lower priority data. For example, rather than regarding time intervals as even or odd, they may instead be regarded in some other manner, which allocates greater numbers of timeslots to one data source than to another.

Although two data sources 414 and 416 are shown, it is understood that time multiplexing can be conducted with any arbitrary number of data sources. In addition, different time multiplexing schedules may be used at different times. For example, one schedule may be used for mornings, another for afternoons, and another for evenings. The different policies may give priority to different data sources at different times. To this end, the policy engine 248 may be coupled to the clock 244 and may vary the time multiplexing policy that the policy engine 248 applies to the scheduler 252 based on time of day as read from the clock 244.

Time multiplexing presumes some basic level of synchronization between the clock 244 on the mobile device 112 and a clock on the server 120. For example, the server 120 typically applies a time de-multiplexing scheme using its own clock to separate incoming data into different data destinations (e.g., corresponding to respective data sources 414 and 416). In some examples, the time multiplexing policy enacted by the policy engine 248 may be based on feedback received from the server 120 by the feedback processor 254, such that the server 120 uses the same policies as the mobile device 112 at the same times.

FIG. 5 shows example operation of the scheduler 252 with a prefix coding policy. According to this policy, a data transmission may start with some bits embedded in one passcode and continue with other bits embedded in other passcodes. For example, the collector 242 may prepare a sequence 510 of 6 bits (B0-B5) for output to the scheduler 252. To provide the sequence 510 of 6 bits according to a prefix coding policy, the scheduler 252 may first output a sequence 520 including bits B0, B1, and B2 and then output another sequence 522 including bits B3, B4, and B5. The first sequence 520 includes a prefix bit 530. The prefix bit 530 is asserted (e.g., set to "1") when fewer than all of the bits 510 can be transmitted in the current passcode. At the server 120, the asserted prefix bit 530 is interpreted as a directive to require the user to submit an additional passcode 314 before the user is allowed to logon. The scheduler 252 then provides the next sequence 522 to be embedded in an additional passcode 314 to complete the 6-bit transmission. In the sequence 522, the prefix bit 530 is de-asserted (e.g., set to "0") to indicate that all bits have been processed. The server 120 interprets the de-asserted prefix bit 530 to mean that the data transmission will not be continuing, and thus that the server 120 need not require the user to enter yet another passcode.

In another example, prefix coding may be used to signal the server 120 whether to apply time multiplexing or not. For example, if the prefix bit 530 is de-asserted, the server 120 is informed that it will be receiving time multiplexed data. But if the prefix 530 is asserted, the server 120 is directed that it will be receiving non-time multiplexed data. The prefix bit 530 can thus be used to force a certain interpretation by the server 120 of the bits that will follow.

In yet another example, prefix coding can be used as a part of a time multiplexing protocol. For example, asserting the prefix bit 530 can signal the server 120 that a data transmission in a current timeslot (e.g., odd) will be continuing in one or more subsequent timeslots (e.g., even). According to this protocol, de-asserting the prefix bit 530 signals the server 120 that the data transmitted in the current passcode 314 will not be continued into the next timeslot.

The prefix coding policy may be used with any arbitrary number of sequences. Also, prefix coding is not limited to a single prefix bit. Although there are rapidly diminishing returns when only four auxiliary bits 310 are provided, it is possible that two or even three prefix bits can be used. These bits can provide additional information to the server 120 prescribing how data received in current and successive passcodes 314 should be interpreted.

Figure 6:
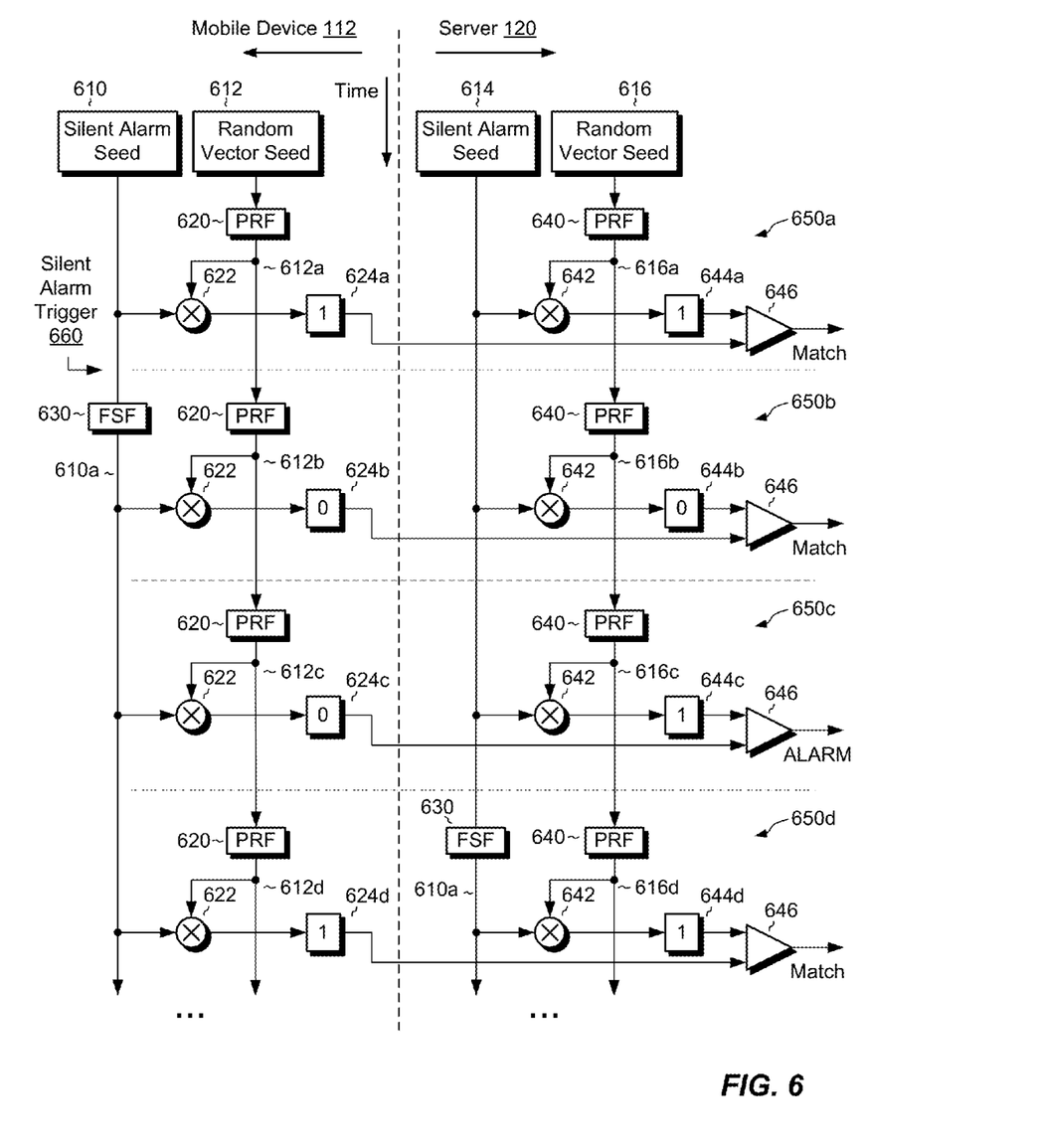
FIG. 6 is a diagram showing example generation of a silent alarm on both the mobile device of FIG. 2 and on the server of FIG. 1, as well as testing of silent alarms on the server to detect mismatches from expected values.

FIG. 6 shows a simplified example of silent alarm operation. As indicated in connection with FIG. 3, the scheduler 252 may include one or more silent alarm bits (e.g., one bit) to indicate whether the mobile device 112 has been tampered with or otherwise subjected to malicious activity.

The silent alarm bit appears to vary randomly. Yet, it follows a specific pattern that allows the mobile device 112 to silently communicate suspect activity to the server 120. If the silent alarm is triggered, the server 120 detects the triggered state and responds. The response of the server 120 may include disabling the soft token on the mobile device 112, refusing to accept future login attempts from the mobile device 112, or other measures. Because the silent alarm bit is one of the auxiliary bits included in passcodes received from the mobile device 112, the silent alarm is bound to the other associated auxiliary bits and can therefore be used directly as an indicator of trust in those other auxiliary bits. Therefore, the server 120 may use the silent alarm in determining whether to trust the data that it receives on other auxiliary bits 310 provided along with the silent alarm. Also, the server 120 may permanently distrust auxiliary bits 310 from a mobile device 112 whose silent alarm has been triggered. In some examples, the server 120 may continue to allow logins from users whose passcodes indicate triggered silent alarms, while closely monitoring them, to collect data on the behavior of such users.

As shown in FIG. 6, activities are conducted in parallel on the mobile device 112 and on the server 120. The mobile device 112 and the server 120 are both provisioned with a silent alarm seed 610/614 and a random vector seed 612/616. The silent alarm seeds 610 and 614 are identical, i.e., they are synchronized between the mobile device 112 and the server 120. The random vector seeds 612 and 616 are also synchronized. In one example, the silent alarm seed 610/614 and random vector seed 612/616 are each 64-bit values. Although the random vector seed 612/616 may be publicly known, the silent alarm seed 610/614 is generally retained as a secret.

Operation will now be described with reference to different time frames 650a-650d. Each timeframe 650a-650d represents an interval of time during which respective passcodes 314 are generated by the mobile device 112. For simplicity, it is shown that each passcode 314 created is sent to the server 120. Those skilled in the art will recognize, however, that the server 120 will typically not receive each passcode 314 generated, but rather can remain synchronized with the mobile device 112 by "fast-forwarding" through different timeframes 650a-650d, employing jump tables, or using other known techniques.

For each passcode 314 produced by the mobile device 112, the silent alarm value (initially, the silent alarm seed 610) is sampled. As shown in timeframe 650a, sampling is initiated by subjecting the random vector seed 612 to a pseudo-random function (PRF) 620 to generate a pseudo-random signal 612a. An inner product multiplier 622 then calculates the modulo-2 of the inner product of the pseudo-random signal 612a and the silent alarm value 610. The result of the inner product is a single silent alarm bit 624a. The sequencer 252 may include this bit 624a as one of the auxiliary bits 310, which is combined with a token code 312 to form a passcode 314 (see FIG. 3).

If the passcode 314 is used as part of a login attempt (as assumed in this example), the passcode 314 is transmitted to the server 120, where the auxiliary bits are extracted, including the silent alarm bit 624a.

A parallel process takes place at the server 120. A random vector seed 616 is subjected to a pseudo-random function (PRF) 640 to generate a pseudo-random signal 616a. The pseudo-random function 640 is identical to the pseudo-random function 620. An inner product multiplier 642 calculates the modulo-2 of the inner product of the pseudo-random signal 616a and the silent alarm value 614. The result of the inner product is a predicted silent alarm bit 644a. The server 120 then compares (e.g., using comparator 646) the predicted silent alarm bit 644a with the actual silent alarm bit 624a that it received via the passcode 314. Since the same operations are performed on the same starting values, the two bits 624a and 644a are identical, and there is a match.

The activities of timeframe 650a can continue as described above. Owing to the pseudo-random function 620, different parts of the silent alarm seed 610 will be sampled and transmitted to the server 120. Without a silent alarm trigger, different silent alarm bits will continue to match between the mobile device 112 and the server 120.

At some point, however, a silent alarm trigger 660 may occur. This trigger may occur in response to a detection of tampering or malware on the mobile device 112, for example. As shown in timeframe 650b, the mobile device 112 increments the state of the silent arm upon detection of the trigger by subjecting the current silent alarm value to a forward secure function (FSF) 630. The forward secure function 630 is a one-way function, such as FS_PRNG, which cannot be reversed. The forward secure function 630 generates a new silent alarm value 610a, which is then used as input to the inner product multiplier 622.

On successive login attempts, silent alarm bits 624b, 624c, and 624d are created, which represent samples of the new silent alarm value 610a. These bits may match expected values on the server 120 by accident, as they do in timeframe 650b (since there is a 50% probability of a match even when samples are taken of different silent alarm values). The probability of continued matches decreases exponentially on successive logins, however, and, eventually, as shown in timeframe 650c, a mismatch is detected.

The mismatch alerts the server 120 that the silent alarm on the mobile device 112 has been triggered and, therefore, that the server should not trust any of the auxiliary bits received with the mismatching silent alarm. The server may also register that auxiliary bits obtained during immediately prior login attempts (e.g., during the timeframe 650b) are also not to be trusted, since there is a reasonable probability that the silent alarm was triggered before the auxiliary bits for those logins were received, as well.

Once the server 120 detects the mismatch, it increments its local silent alarm value (e.g., during timeframe 650d) by subjecting its local silent alarm value to the same forward secure function 630 as was used during timeframe 650b on the mobile device 112. The silent alarm values between the mobile device 112 and the server 120 will then once again be in sync, and sampled silent alarm bits will continue to match until another silent alarm trigger, like the silent alarm trigger 660, occurs. Further activity may be required, however, before the server 120 trusts any auxiliary bits 310 received from the mobile device 112, as it may remain to be determined whether or not the event that caused the silent alarm trigger 660 indicates a permanent security breach.

Figure 7:
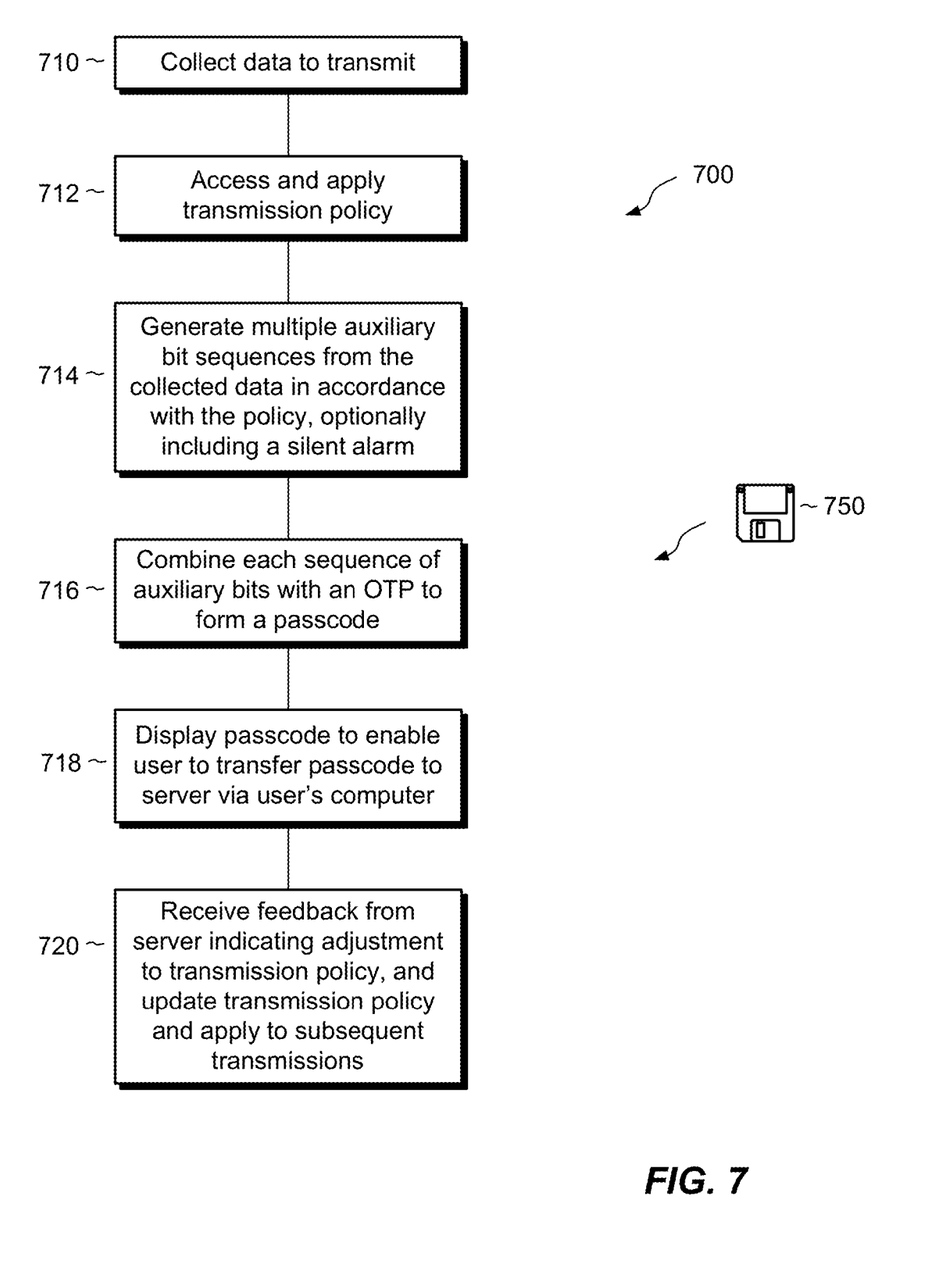
FIG. 7 is a flowchart showing an example process for transmitting multiple sequences of auxiliary bits from the mobile device of FIG. 2 to the server of FIG. 1.

FIG. 7 shows an example process 700 for transmitting data between a mobile device 112 and a server 120 by means of passcodes 314 used during logins. The process 700 is typically performed by the software constructs of the mobile device 112, described in connection with FIG. 2, which reside in the memory 240 of the mobile device 112 are run by the set of processors 230. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

At step 710, data is collected for transmission. For example, the collector 242 may collect any type of data, including, for example, information about the hardware, software, or environment of the mobile device 112.

At step 712, a transmission policy is accessed and applied. For example, the sequencer 252 receives a policy from the policy engine 248. In some examples, the policy engine 248 stores multiple policies, and policies are selected and/or modified based on feedback from the server 120 received by the feedback processor 254. Example policies include time multiplexing policies, prefix coding policies, combinations of multiplexing and prefix policies, and/or other policies. The scheduler 252 is then configured to output data according to the currently active policy of the policy engine 248.

At step 714, the scheduler 252 generates multiple sequences of auxiliary bits 310 in accordance with the active policy. For example, the scheduler 252 may generate multiple 4-bit sequences of auxiliary bits 310 from the data collected by the collector 242. Each auxiliary bit sequence 310 optionally includes one or more silent alarm bits, which indicate to the server 120 whether the respective sequence of auxiliary bits 310 can be trusted.

At step 716, each sequence of auxiliary bits 310 is combined with a respective token code 312 to form a passcode. As indicated in connection with FIG. 3, the auxiliary bits 310 and token code 312 are combined by the embedder 256, which applies a reversible blending operation. The server 120 typically maintains a reverse blending operation, to separate the auxiliary bits 310 from the token code 312 when the passcode 314 is received during a login attempt.

At step 718, a passcode 314 is displayed. For example, the mobile device 112 may display a passcode 314 in the passcode image 312 of the display 210 of the mobile device 212. Displaying the passcode 314 enables a user to read the passcode 314 and manually transfer it to the user's local computing devices 114, where the passcode 314 can be entered into a login field and submitted to the server 120 as part of an authentication request.

At step 720, feedback may be received from the server 120 indicating an adjustment to a transmission policy. The policy is updated and applied to subsequent transmissions. For example, the feedback processor 254 may receive information from the server 120 to update one or more policies stored in the policy engine 248, or to select one of multiple policies stored in the policy engine 248 and apply such policy going forward.

An improved technique has been described that provides scheduled data transfer between a mobile device 112 and a server 120. The mobile device 120 combines token codes 312 generated by a token generator 250 with sequences of auxiliary bits 310 and displays the combinations to users as passcodes 314. Users may then copy the passcodes to their computing devices 114 for authenticating to the server 120. As the passcodes 314 include both token codes 312 and sequences of auxiliary bits 310, a communication channel is established whereby the auxiliary bits 310 as well as the token codes 312 are transmitted from the mobile device 112 to the server 120. The server 120 may then extract the token codes 312 and auxiliary bits 310 from passcodes 314 it receives, apply the token codes 312 for authentication, and use the auxiliary bits 310 for a range of operations, which may include but are not limited to authentication.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described one embodiment, numerous alternative embodiments or variations can be made. For example, although the auxiliary bits 310 are shown and described as including a silent alarm bit, this is merely an example. The scheduler 252 may selectively include or exclude the silent alarm bit from the auxiliary bits 310, or a system may be provided in accordance with the principles hereof in which there is no silent alarm bit or silent alarm function.

Also, certain embodiments include multiple silent alarm bits. Different silent alarm bits can be provided for monitoring different facets of the mobile device 112. For example, one silent alarm bit can be provided for monitoring software status, another for monitoring hardware status, and another for monitoring system environment. Each silent alarm bit can have a dedicated bit position in the auxiliary bits 310. Bit positions of silent alarm bits may also be established or modified based on feedback from the server.

Also, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 750 in FIG. 7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of transmitting data from a mobile device to a server through a computing device connected to the server over a network, comprising:
   collecting a set of data stored on the mobile device;
   generating multiple sequences of auxiliary bits representing different portions of the set of data;

combining individual sequences of auxiliary bits with respective token codes generated by a soft token generator running on the mobile device to produce multiple passcodes; and displaying the passcodes to a user for manual transfer by the user to the computing device connected to the server over the network and for submission from the computing device to the server over the network, wherein the sequences of auxiliary bits are generated according a scheduling policy having at least one scheduling protocol, wherein the method further comprises the mobile device receiving information from the server to modify the at least one scheduling protocol, wherein the at least one scheduling protocol includes a time multiplexing protocol, the time multiplexing protocol directing the act of generating multiple sequences of auxiliary bits to produce a first set of auxiliary bits during each of a first set of time intervals and to produce a second set of auxiliary bits during each of a second set of time intervals, and wherein the at least one time multiplexing protocol assigns at least one of the auxiliary bits to be a prefix bit to indicate to the server whether a data transmission will continue after a current sequence of auxiliary bits is combined with a token code and displayed.

2. The method of claim 1, further comprising configuring at least one bit the auxiliary bits of a sequence of auxiliary bits as a silent alarm, the silent alarm indicating whether the mobile device has been subjected to malicious activity.

3. The method of claim 2, further comprising:
generating the silent alarm on the mobile device from an initial multi-bit silent alarm seed shared between the soft token generator and the server; and
subjecting the silent alarm to a forward-secure function shared between the soft token generator and the server in response to a detection of malicious activity,
wherein the silent alarm alerts the server whether to treat the auxiliary bits of a sequence as trusted or untrusted.

4. The method of claim 1, wherein the at least one scheduling protocol includes multiple scheduling protocols, and wherein the information received from the server includes a direction to transmit data according to a particular one of the multiple scheduling protocols.

5. The method of claim 1, further comprising directing, by the time multiplexing protocol, generating the multiple sequences of auxiliary bits to produce a third set of auxiliary bits during each of a third set of time intervals, wherein the first, second, and third time intervals refer to different times of day.

6. The method of claim 1, wherein the time multiplexing protocol defines multiple schedules for transmitting different sequences of auxiliary bits at different times, where different time multiplexing schedules are selected at different times.

7. The method of claim 6, further comprising selecting one of the time multiplexing schedules for use in generating multiple sequences of auxiliary bits based on information received from the server.

8. The method of claim 1, wherein the first set of time intervals includes a greater number of time intervals than the second set of time intervals, and wherein higher priority data is transmitted during the first set of time intervals than during the second set of time intervals.

9. The method of claim 1, wherein the at least one scheduling protocol includes a protocol for extending a data transmission over multiple sequences of auxiliary bits displayed with multiple passcodes.

10. The method of claim 9, further comprising:
assigning at least one of the auxiliary bits to be a prefix bit to indicate whether a data transmission will continue after a current sequence of auxiliary bits is combined with a token code and displayed;
displaying a passcode that includes a first portion of the data transmission with the prefix bit asserted; and
displaying another passcode that includes a final portion of the data transmission with the prefix bit de-asserted.

11. The method of claim 10, wherein the at least one prefix bit includes multiple prefix bits, wherein the prefix bits inform the server about information that is to be received in future sequences of auxiliary bits.

12. An apparatus including a soft token generator for generating token codes for authenticating a user to a server through a computing device connected to the server over a network the apparatus comprising:
a set of processors;
memory, coupled to the set of processors, the memory constructed and arranged to store instructions executable by the set of processors; and
a display,
wherein the set of processors executing instructions from the memory forms a specialized circuit arranged to:
collect a set of data stored on the apparatus;
generate multiple sequences of auxiliary bits representing different portions of the set of data;
combine individual sequences of auxiliary bits with respective token codes generated by the soft token generator to produce multiple passcodes; and
display the passcodes on the display for manual transfer by the user to the computing device connected to the server over the network
wherein the at least one scheduling protocol includes a time multiplexing protocol, the time multiplexing protocol directing the specialized circuit to generate multiple sequences of auxiliary bits to produce a first set of auxiliary bits during each of a first set of time intervals and a second set of auxiliary bits during each of a second set of time intervals, and
wherein the time multiplexing protocol defines multiple schedules for transmitting different sequences of auxiliary bits at different times, wherein different time multiplexing schedules are selected at different times.

13. The apparatus of claim 12, wherein the sequences of auxiliary bits are generated according to a scheduling policy having at least one scheduling protocol, and wherein the specialized circuit is further arranged to receive information from the server to modify the at least one scheduling protocol.

14. The apparatus of claim 12, wherein the at least one scheduling protocol includes a protocol for extending a data transmission over multiple sequences of auxiliary bits displayed with multiple passcodes.

15. A non-transitory computer readable medium including instructions which, when executed by a set of processors of a mobile device, cause the set of processors to perform a method of transmitting data from the mobile device to a server through a computing device connected to the server over a network, the method comprising:
collecting a set of data stored on the mobile device;
generating multiple sequences of auxiliary bits representing different portions of the set of data;
combining individual sequences of auxiliary bits with respective token codes generated by a soft token generator running on the mobile device to produce multiple passcodes; and displaying the passcodes to a user for manual transfer by the user to the computing device connected to the server over the network, wherein the sequences of auxiliary bits are generated according a scheduling policy having at least one scheduling protocol, and wherein the at least one scheduling protocol includes a protocol for extending a data transmission over multiple sequences of auxiliary bits displayed with multiple passcodes.

16. The non-transitory computer readable medium of claim 15, wherein the at least one scheduling protocol includes a time multiplexing protocol, the time multiplexing protocol directing the act of generating multiple sequences of auxiliary bits to produce a first set of auxiliary bits during each of a first set of time intervals and to produce a second set of auxiliary bits during each of a second set of time intervals.

17. The non-transitory computer readable medium of claim 16, wherein the time multiplexing protocol defines multiple schedules for transmitting different sequences of auxiliary bits at different times, where different time multiplexing schedules are selected at different times.

18. The non-transitory computer readable medium of claim 16, wherein the at least one time multiplexing protocol assigns at least one of the auxiliary bits to be a prefix bit to indicate to the server whether a data transmission will continue after a current sequence of auxiliary bits is combined with a token code and displayed.

19. The non-transitory computer readable medium of claim 15, wherein the first set of time intervals includes a greater number of time intervals than the second set of time intervals, and wherein higher priority data is transmitted during the first set of time intervals than during the second set of time intervals.

20. The non-transitory computer readable medium of claim 15, wherein the method further comprises:

assigning at least one of the auxiliary bits to be a prefix bit to indicate whether a data transmission will continue after a current sequence of auxiliary bits is combined with a token code and displayed;

displaying a passcode that includes a first portion of the data transmission with the prefix bit asserted; and displaying another passcode that includes a final portion of the data transmission with the prefix bit de-asserted.

* * * * *